United States Patent [19]

Tassic et al.

[11] Patent Number: 5,272,924
[45] Date of Patent: Dec. 28, 1993

[54] SYSTEM AND METHOD FOR MONITORING TENSION LOADING OF A CONVEYOR CHAIN

[75] Inventors: William P. Tassic, 42036 Queen Anne Ct., Northville, Mich. 48167; Mark A. Hockert, Bettendorf, Iowa; Robert L. Miller, Davenport, Iowa; Randall J. Peterson, Davenport, Iowa

[73] Assignee: William P. Tassic, Northville, Mich.

[21] Appl. No.: 788,204

[22] Filed: Nov. 5, 1991

[51] Int. Cl.5 .................................. G01L 5/04
[52] U.S. Cl. ..................... 73/862.391; 73/862.474
[58] Field of Search ............ 73/862.391, 862.392, 73/862.474, 862.624, 862.627, 773; 29/DIG.

[56] References Cited

U.S. PATENT DOCUMENTS

| | | | |
|---|---|---|---|
| 2,590,626 | 3/1952 | Jones | 73/862.382 |
| 3,100,290 | 8/1963 | Propper | 338/5 |
| 3,246,510 | 4/1966 | Ruge | 73/862.622 |
| 3,559,474 | 2/1971 | Gurol et al. | 73/862.635 |
| 4,079,624 | 3/1978 | Kurtz | 73/862.625 |
| 4,282,762 | 8/1981 | Zenker | 73/862.52 |
| 4,420,755 | 12/1983 | Primbs, Jr. | 340/870.38 |
| 4,566,339 | 1/1986 | Davidson et al. | 73/862.392 |
| 4,770,049 | 9/1988 | Jones et al. | 73/862.635 |
| 4,803,886 | 2/1989 | May et al. | 73/862.392 |

FOREIGN PATENT DOCUMENTS 204154 9/1980 United Kingdom.

Primary Examiner—Richard E. Chilcot, Jr.
Assistant Examiner—Elizabeth L. Dougherty
Attorney, Agent, or Firm—Brooks & Kushman

[57] ABSTRACT

A system and method for monitoring the tension loading of a conveyor chain (12) utilizing a transducer (22) that is mounted on the chain to travel therewith and generate an electrical signal based on the tension of the chain (12) and a data logger (60) mounted on the chain for converting the electrical signal into tension data for storage in a memory (132) of the logger on the chain. The system also includes an infrared transmitter (146) for generating a position signal representing a predetermined position of the chain (12). The method utilizes the data logger (60) and involves mounting the logger on the chain and placing the chain under tension. The method further involves generating an electrical signal based on the tension of the chain, converting the electrical signal into tension data and storing the tension data in the memory on the chain.

37 Claims, 10 Drawing Sheets

MARKER BEACON ENCODING

SYSTEM AND METHOD FOR MONITORING TENSION LOADING OF A CONVEYOR CHAIN

TECHNICAL FIELD

This invention relates to a system and method for monitoring the tension loading of a link-type conveyor chain including a strain gauge transducer.

BACKGROUND ART

Conveyor chains for heavy duty conveyors conventionally include single and dual links pivotally connected in an alternating relationship along an axis of the chain. The single link is conventionally referred to as a "dog bone" link in that it has a smaller intermediate portion and opposite ends that are enlarged. At each enlarged end, adjacent ends of the adjacent pair of dual links are pivotally connected to the enlarged end of the dog bone single link by an associated connection pin that extends vertically. Three basic types of conveyors incorporate this type of conveyor chain. One of these types of conveyors is referred to as an overhead monorail and is suspended by trollies from a horizontally extending beam having flanges on which rollers of the trollies ride.

Another of these types of conveyors is referred to as an overhead power and free and is basically the same as the overhead monorail except that another horizontal beam below the conveyor chain supports load trollies which are connected to and detached from the conveyor chain by clutch dogs at stations along which the conveyor chain conveys loads supported by the load trollies.

A third type of these conveyors is referred to as an inverted power and free and is basically the same as the overhead power and free except for the fact that the conveyor chain is supported for movement above a horizontal beam on which trolley rollers are supported and load trollies are supported above the chain by another horizontal beam for movement upon connection thereof to the chain by clutch dogs as well as being released from the chain by the clutch dogs when necessary.

When conveyor chains of the type involved with the present invention are negotiating certain areas of the conveyor, wear of the conveyor components involved can excessively tension the chain and thereby eventually cause failure. For example, a conveyor chain negotiating a turn is moved over a roller which, if not properly greased, can produce friction and/or wear that may tension the chain beyond its normal operating tension.

Any failure of the chain shuts down the conveyor and thereby causes an enormous financial loss. This is especially the case if the conveyor involved feeds components to other conveyor lines of the factory and thereby also shuts down the other conveyor lines.

In order to sense conveyor chain loading in order to permit proper maintenance of the conveyor, it has previously been proposed to utilize strain gauges with links of the conveyor chain. See, for example, U.S. Pat. Nos. 4,566,339, Davidson et al., and 4,803,886 May et al., and United Kingdom Patent application 2,041,549 of inventor Cecil J. Austen. Each of these prior references discloses a conveyor chain wherein the single link has strain gauges applied thereto so as to sense the loading, and the load signal sensed may be sent by telemetry or otherwise for monitoring. Since the strain gauges utilized with these prior art references are applied directly to the link that carries the load, the load reading is not particularly sensitive.

Other prior art references which were noted during the investigation conducted for the present invention, but which are not believed to be analogous prior art because the transducers involved are not for use with a conveyor chain, are set forth below along with a description of the use for which the transducer is designed.

U.S. Pat. No. 2,590,626, Jones, discloses a tension yoke for compression load weighing stations wherein a compression column on which strain gauges are mounted is compressed by a load transmitting member located in engagement with an inner flat link located between two outer flat links.

U.S. Pat. No. 3,100,290, Propper, discloses a columnar stress sensing member which includes a strain gauge element located between a stress applying part and a stress resisting part with strain gauges mounted within a cylindrical surface of the strain element.

U.S. Pat. No. 3,246,510, Ruge, discloses a non-linearity compensation means for electrical strain gauge transducer wherein one disclosed embodiment has a transducer element located between two connectors where a force is applied and having a central round opening in which strain gauges are mounted to sense the loading.

U.S. Pat. No. 3,559,474, Gurol et al., discloses a force transducer load cell which includes an annular member having an outer surface on which strain sensitive elements are mounted to sense loading.

U.S. Pat. No. 4,079,624, Kurtz, discloses a load washer transducer assembly which also has an annular shape and an outer surface on which sensor elements are mounted.

U.S. Pat. No. 4,282,762, Zenker, discloses a load sensing transducer which includes an annular member on which strain gauges are mounted to sense loading.

U.S. Pat. No. 4,420,755, Primbs, Jr., discloses a telemetry load link assembly for measuring strain in a load cable between an aircraft and a recovered object.

U.S. Pat. No. 4,770,049, Jones et al., shapes having strain gauges mounted on outwardly facing surfaces.

SUMMARY OF INVENTION

It is therefore an object of the present invention to provide a method and system for accurately monitoring the tension loading of a conveyor chain by providing a strain gauge transducer and a programmable logic device including a memory which are adapted to be mounted on the chain.

In carrying out the above object and other objects of the invention, a system is provided for use with a conveyor having conveyor chain comprising a transducer that is mounted on the chain to travel therewith and generate an electrical signal based on the tension of the chain; and a programmable logic means that is mounted on the chain and coupled to the transducer, the programmable logic means including a memory and including means for converting the electrical signal into tension data for storage in the memory.

Preferably, the system also comprises an infrared generating means for generating a position signal which represents a predetermined position along the path of chain movement. The system also includes means for converting the position signal into position data for storage in the memory and means for correlating the tension data and the position data.

In further carrying out the above object and other objects of the present invention, a method is provided for monitoring the tension of a conveyor chain including a strain gauge transducer for producing electrical strain signals that indicate the tension of the chain. The method comprises mounting the programmable logic means including the memory on the chain and placing the chain under tension. The method also includes generating an electrical signal based on the tension of the chain, converting the electrical signal into tension data and storing the tension data in the memory on the chain.

The advantages accruing to the above system and method are numerous. For example, use of an infrared generating means instead of telemetry results in a less costly and more accurate system. Additionally, infrared signals are not affected by electrical "noise" and are not closely regulated by the FCC.

The above object and other objects, features and advantages of the present invention will be readily appreciated by one of ordinary skill in the art from the following detailed description of the best modes for carrying out the invention when taken in connection with the accompanying drawings.

BRIEF DESCRIPTION OF DRAWINGS

FIG. 5b is a cross-sectional view of the battery pack with the battery mount and chain shown in phantom, taken along line 5b—5b shown in FIG. 5a;

FIG. 6b is a plan view of the data logger and link shown in FIG. 6a;

BEST MODES FOR CARRYING OUT THE INVENTION

Figure 1:
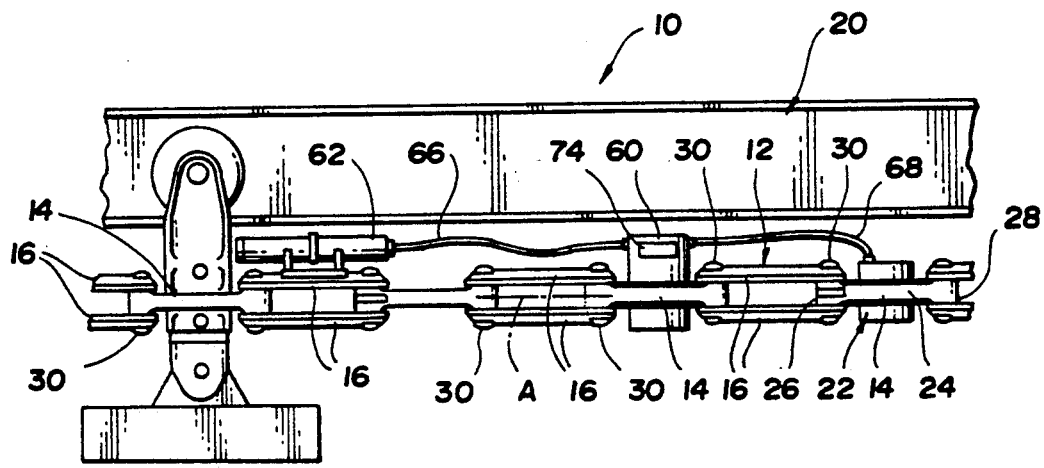
FIG. 1 is a side elevational view of a conveyor whose chain includes a transducer for sensing the tension loading of the chain, a data logger for storage of tension loading data and a battery pack for energizing the transducer and the data logger.

Referring now to FIG. 1, there is shown a conveyor generally indicated at 10 including a conveyor chain 12. The chain 12 is of the type including a plurality of single links 14 and dual links 16 pivotally connected in an alternating relationship along an axis A of the chain 12 for moving a plurality of trollies 18 (only one shown) around the conveyor 10 on a beam 20.

Each of the single links 14 is of the conventional "dog bone" construction including an intermediate portion that extends between enlarged ends. The dual links 16 are positioned above and below the single links 14 and cooperate therewith to provide the chain 12 with the capability to negotiate horizontal turns during conveyance in a closed loop.

Figure 2:
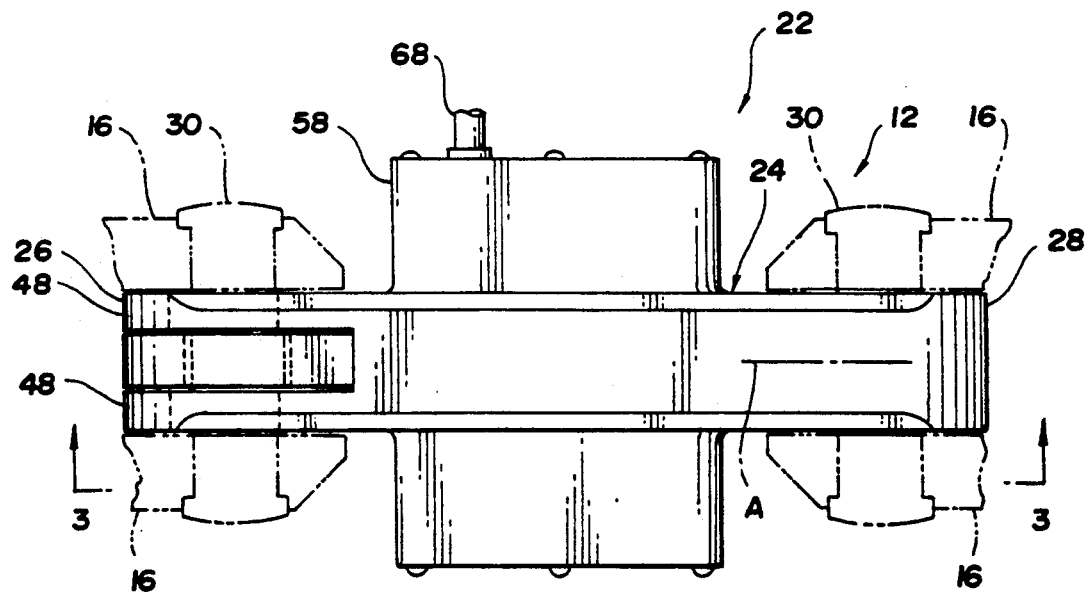
FIG. 2 is an enlarged view of the transducer and transducer link taken in the same direction as FIG. 1.

As best shown in FIG. 2, the transducer 22 preferably includes a transducer link 24 having opposite ends 26 and 28 for connection along the chain between links of the chain 12. More specifically, the transducer link 24 is shown in FIG. 2 as replacing one of the "dog bone" shaped links 14 with its opposite ends 26 and 28 connected by the connection pins 30 to associated pairs of dual links 16.

Figure 3:
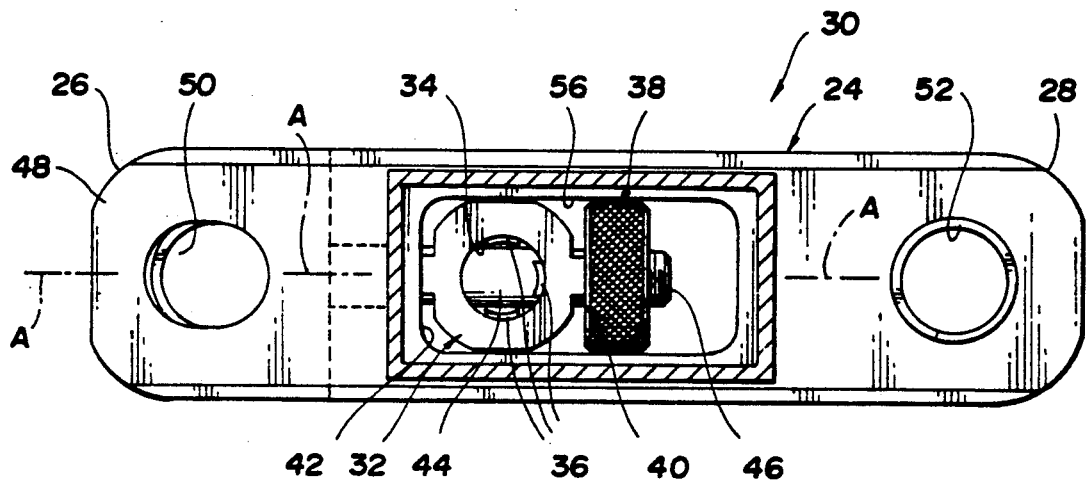
FIG. 3 is a bottom plan view of the transducer link shown in FIG. 2 illustrating the transducer member.

With additional reference to FIG. 3, transducer 22 is shown include a transducer member 32 mounted by the transducer link 24 between its ends. The transducer member includes an opening 34 that extends transversely to the chain axis A and also includes at least one strain gauge 36 of the electrical resistance type mounted on the transducer member. A clamp 38 of the transducer compresses the transducer member 32 as tension loading is applied between the opposite ends of the transducer link 24 so as to provide a strain gauge indication of the extent of the tension loading to which the conveyor chain 12 is subjected. It should be appreciated that the preferred transducer, therefore, is formed as a tension-transmitting member of the chain 12.

In the preferred construction, the clamp 38 includes a clamp member 40 and the transducer link includes a clamping seat 42 that opposes the clamp member. The clamp 38 also includes a connector that extends between the clamp member 40 and one end of the transducer link with the transducer member clamped therebetween to sense the tension loading of the chain 12.

In its preferred construction, the transducer member includes a hole extending therethrough in opposite directions from the opening thereof along the axis of the chain. The connector of the clamp 38 in the preferred construction disclosed includes a connector end located adjacent the one end of the transducer link 24 to which the connector extends and a shank 44 that extends from the connector end through the hole in the . transducer member 32 so as to extend across the transducer member opening 34 as shown in FIG. 3.

The transducer link of the transducer 22 preferably has a unitary construction with its one end 26 having a bifurcated shape including spaced legs 48 between which the connector end of the connector is located. The opposite ends 26 and 28 of the transducer link both include connection pin openings 50 and 52, respectively. The spaced legs 48 of the bifurcated end have connection pin openings that are aligned with the connection pin opening 50 and are elongated along the axis A of the chain such that the legs do not carry tension loading of the chain 12 unless the transducer member fails under the tension loading of the chain, whereupon the spaced legs of the bifurcated end of the transducer link carry the chain tension. As such, the conveyor chain 12 will continue to operate without any disruption of its conveying function.

Figure 4:
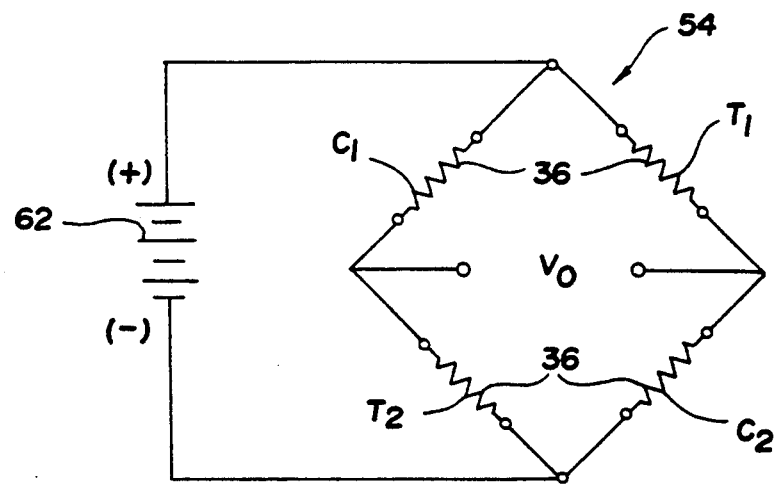
FIG. 4 is an illustration of an electrical circuit including a Wheatstone bridge for use with the present invention.

As illustrated by combined reference to FIGS. 3 and 4, at least one strain gauge 36 of the transducer member 32 is mounted within its transversely extending opening 34. In the preferred embodiment, the transducer member includes two tension strain gauges $T_1$ and $T_2$ and two compression strain gauges $C_1$ and $C_2$, and a Wheatstone bridge 54 connects the tension and compression strain gauges of the transducer member.

Transducer link 24 illustrated in FIG. 2 and 4 is preferably made as an investment casting of stainless steel although it can also be machined from stainless steel stock, such as 17-PH-4 steel or alloy steel stock, such as 8642 steel. The link 24 includes a central cavity 56 an which the transducer member 32 is received and compressed by the clamp 38. Preferably, the link 24 includes a housing 58, which allows for suitable electrical circuitry associated with transducer 22 to be mounted therein.

Referring again to FIG. 1, a programmable logic means or data logger 60 and a battery pack 62 are mounted on the conveyor chain 12. The data logger 60 includes a window 74 through which infrared signals travel, as described in greater detail hereinbelow. Battery pack 62 supplies electrical energy to the logger 60 through cabling 66. Cabling 68 permits the battery pack 62 to also supply power to the transducer 22. The battery pack 62 is preferably mounted to an upper section of a dual link 16 of the chain 12 by a battery mount 64.

Figure 5A:
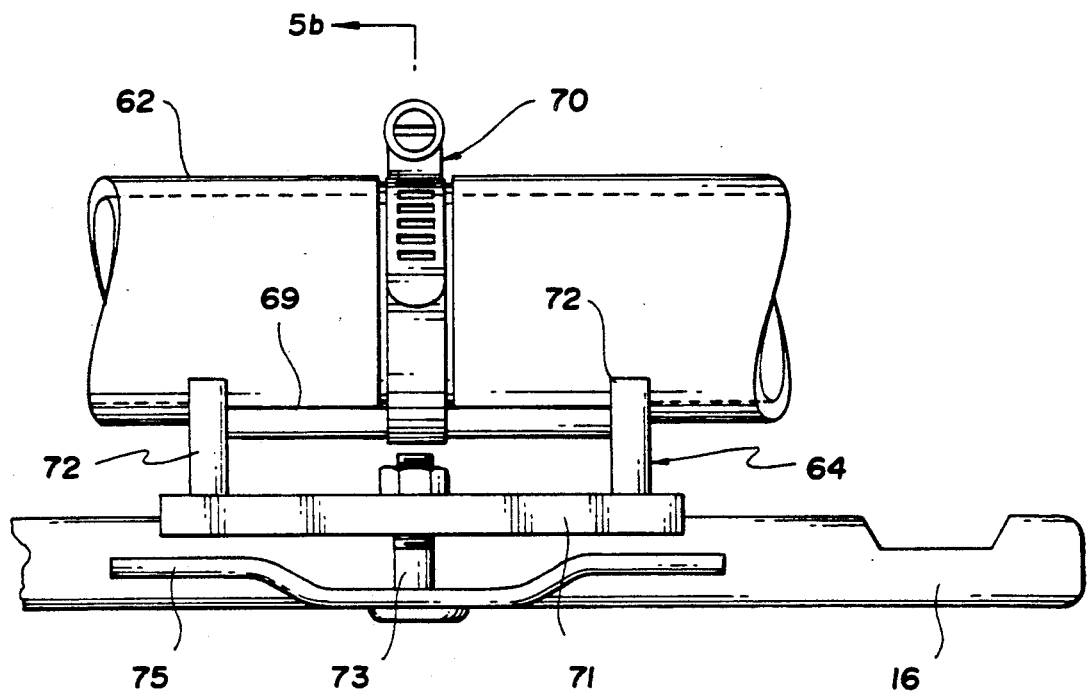
FIG. 5a is a side elevational view of the battery pack in cooperation with the battery mount mounted on the chain in accordance with the present invention.
Figure 5B:
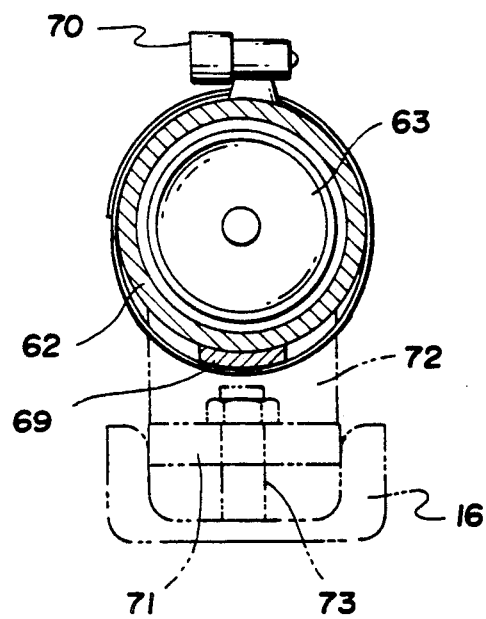

As best shown in FIGS. 5(a and 5b) the battery mount 64 preferably includes a pair of U-shaped braces 72, an upper beam 69 and lower beam 71. Beams 69 and 71 are fixedly attached to the braces 72. The battery mount is secured to the link 16 by a bolt 73 or the like. The bolt 73 extends through a hole formed in the webbing structure 75, which is forged into the link 16. It should be appreciated that the battery mount 64 could be made of a ferromagnetic material, thereby allowing the mount to be quickly affixed to the link 16.

The U-shaped braces 72 receive the generally cylindrical battery pack 62 and thus cradle the battery pack, similar to a mount for a rifle telescope. The battery pack 62 is retained within the mount 64 by a clamping means 70, such as a stainless steel hose clamp, which cooperates with the upper beam 69.

It should be appreciated that the particular application will affect the length of the cabling 66 and 68, with the shortest cabling allowing the battery pack 62, transducer 22 and data logger 60 to be located as close to each other as possible. The system functions best if the length of the cabling 66 or 68 however, is less than four (4) feet.

In the preferred embodiment, the battery pack 62 comprises a plurality of alkaline batteries 63 (only one shown). It should be noted, of course, that other battery types, such as lithium or nickel-cadmium (NiCad), could also be employed. Generally, NiCad batteries are available in standard or extended temperature versions. Alkaline batteries were chosen primarily due to their extended life (amp-hour capacity), which is especially longer than the extended temperature NiCad batteries. The use of four (4) "D" size batteries 63 should provide about 6.0 volts at 14 amp-hours at a temperature rating of $-20°$ C. to $+54°$ C. The alkaline primary type cells provide power for more than 120 days at a low discharge rate. Lithium batteries, which are disposable, may also be utilized and provide an additional 40 to 60 days of operational service.

Figure 6A:
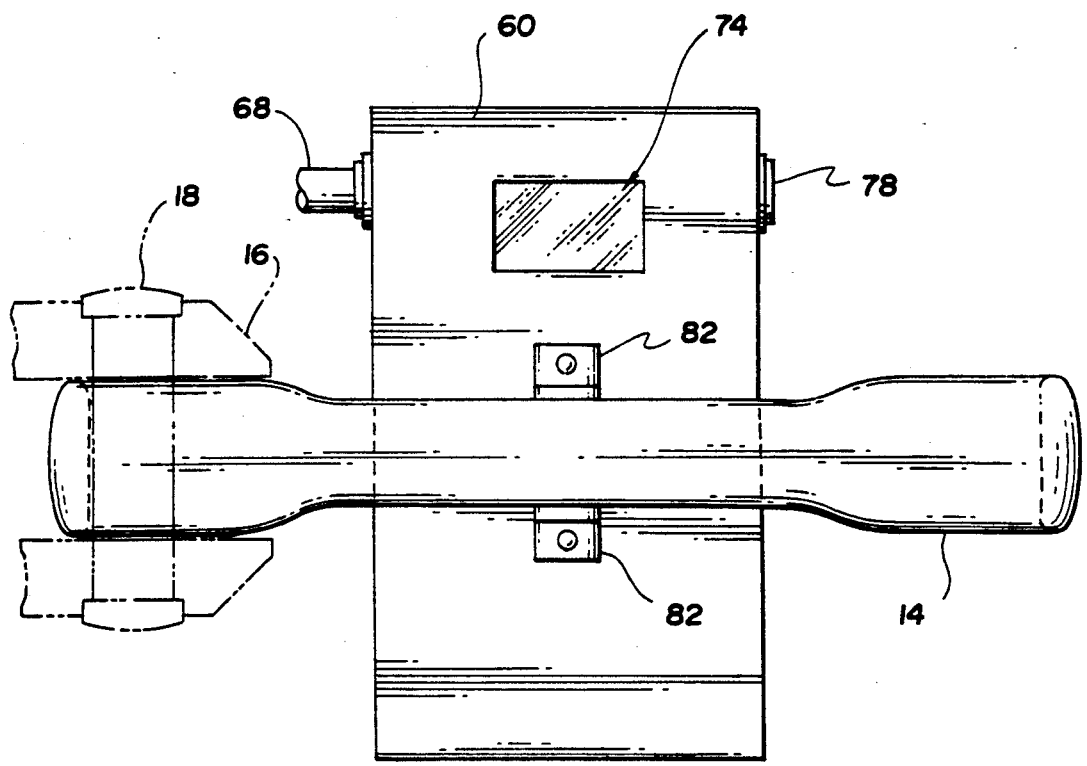
FIG. 6a is an illustration of a first method of mounting the data logger to a link of the chain.
Figure 6B:
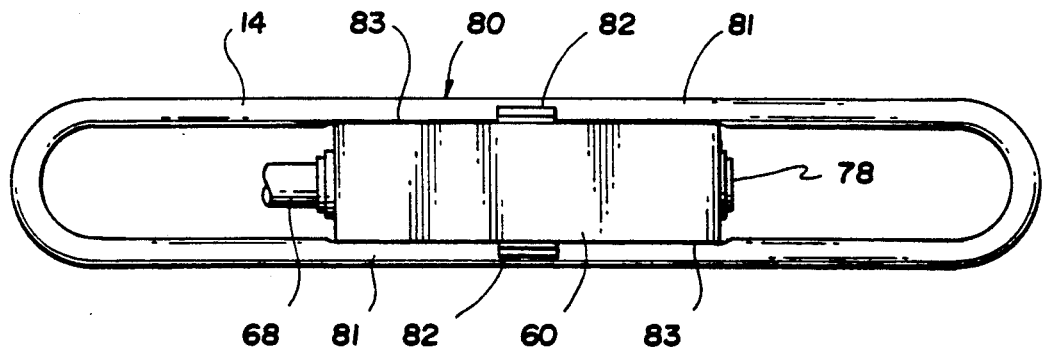

As shown in FIGS. 6a and 6b, the data logger 60 is adapted to be mounted to a "dog bone" link 14 of the chain 12. The data logger 60 is preferably slidably received within an intermediate portion 80 of the link 14. The data logger 60 can be connected to a personal computer 102 via connector 78, as described in greater detail below.

As best shown in FIG. 6b, the intermediate portion 80 is shown as having a pair of spaced apart tension-transmitting members 81. The members 81 preferably include inner surfaces 83 which are sized so as to create a cavity in which the logger 60 is received. A plurality of angle brackets 80 cooperate with the intermediate portion 80 and are affixed to both sides of the logger 60 above and below the link 14 so as to secure the logger 60 thereto.

Figure 6C:
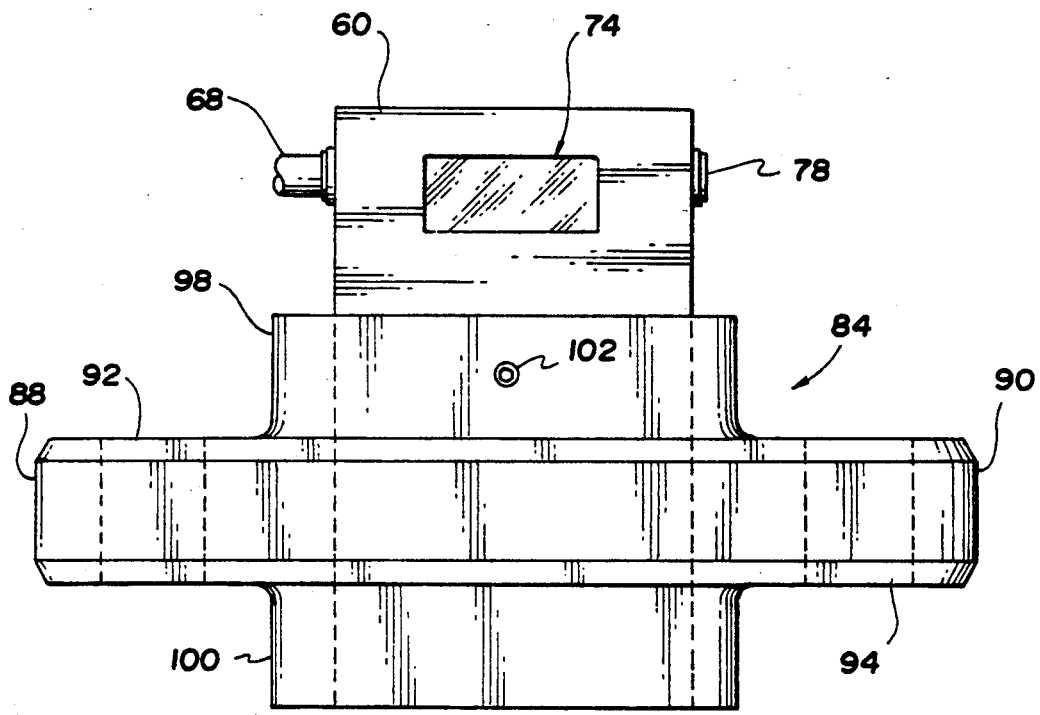
FIG. 6c is an illustration of an alternate method of mounting the data logger to a link of the chain.
Figure 6D:
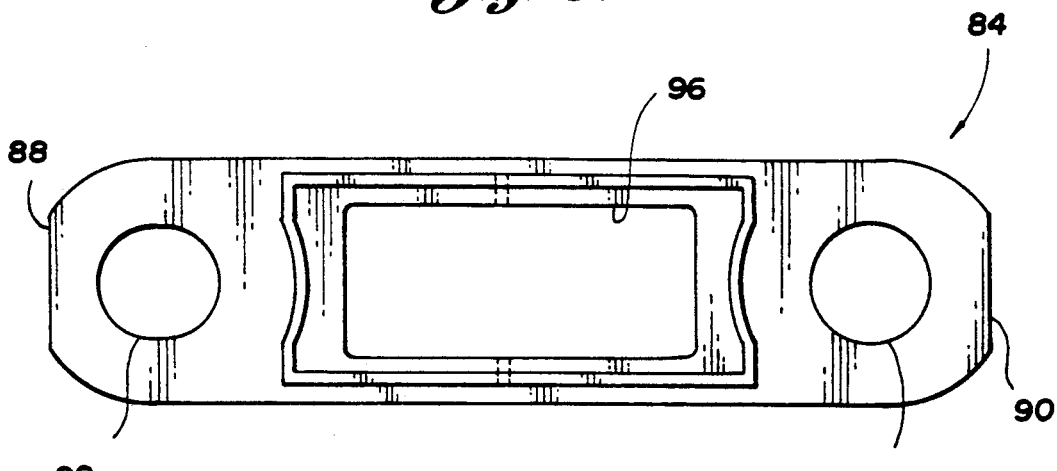
FIG. 6d is a partial plan view of the data logger and link shown in FIG. 6c.

Referring now to FIGS. 6c and 6d, an alternative mounting of the data logger to the chain 12 is illustrated, wherein the logger 60 is slidably received by a logger link 84. The logger link 84 preferably replaces a "dog bone" shaped link 14 with its opposite ends 88 and 90 connected by connection pins (not specifically illustrated) to associated pairs of dual links as previously described. The connection pins pass through connection pin openings 92 and 94.

As best shown in FIG. 6d, the logger link 84 has a unitary construction and includes a central cavity 96. Most preferably, the link 84 is made as an investment casting and includes a pair of housing portions 98 and 100 projecting in opposite directions from the cavity 96. The data logger 60 is mounted within the housing portions and secured thereto on both sides by a set screw 102. It should be noted that the housing portions are sized such that the infrared window 74 is not covered.

Figure 6E:
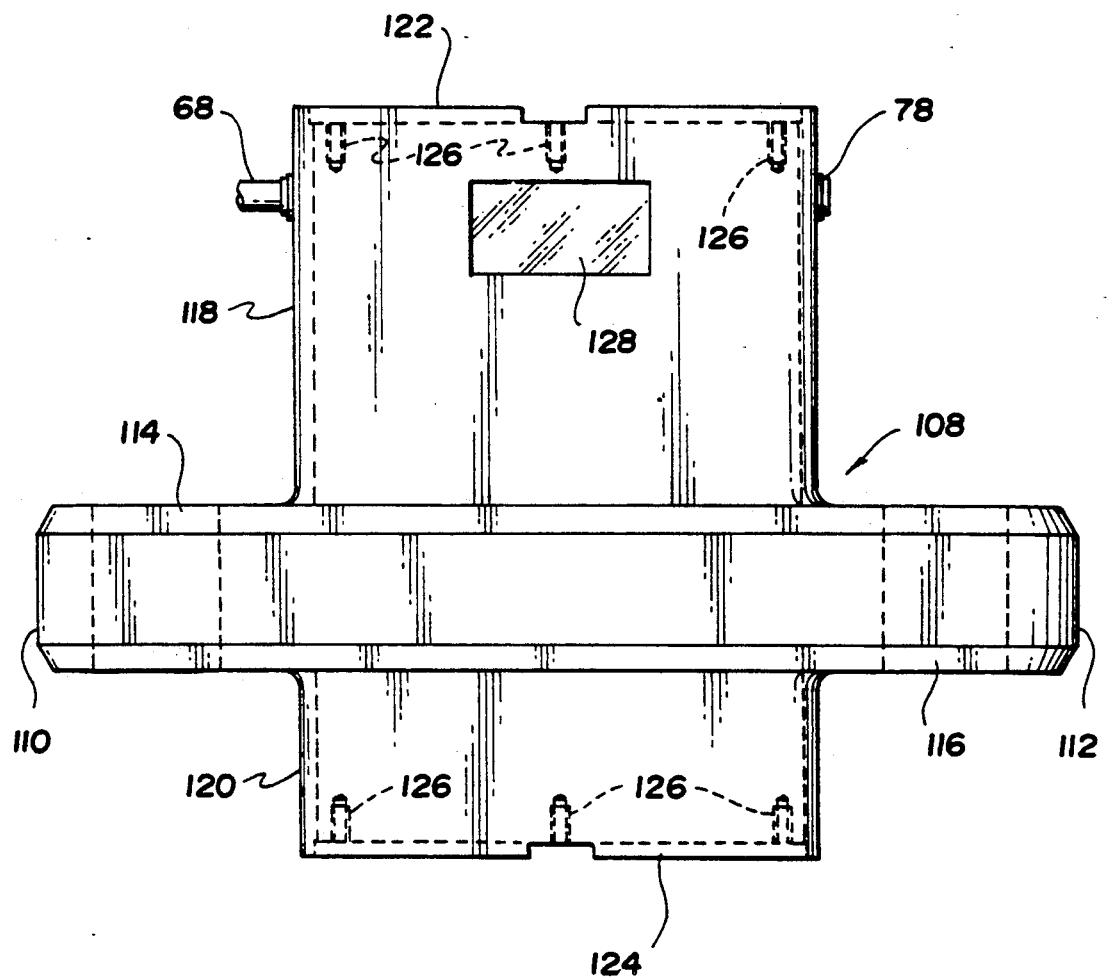
FIG. 6e is an illustration of a third alternate method of mounting the data logger to a link of the chain.

Yet another method of mounting the data logger 60 to the chain 12 is illustrated in FIGS. 6e, wherein the logger is slidably received by a logger link 108. It should be noted that the logger link 108 is substantially similar to the logger link 84 shown in n FIGS. 6c and 6d. Thus, the link 108 preferably replaces a "dog bone" shaped link 14 with its opposite ends 110 and 112 connected by connection pins (not specifically illustrated) to associated pairs of dual links as previously described. The connection pins pass through connection pin openings 114 and 116.

In the preferred embodiment, the logger link 108 has a unitary construction and includes a central cavity (not specifically illustrated). Most preferably, the link 108 is made as an investment casting although it can also be machined from 17-PH-4 stainless steel stock or 8642 alloy steel stock. The link 108 includes a pair of housing portions 118 and 120 projecting in opposite directions from the cavity. The link 108 further includes a top cover 122 and a bottom cover 124 which cooperate with the housing portions 118 and 120, respectively, to create an interior which receives the logger 60. The data logger 60 is mounted within the interior and secured to the top and bottom covers by screws or the like via threaded bores 126. It should be noted that the housing portion 118 includes a window 128 through which infrared signals travel.

Figure 7:
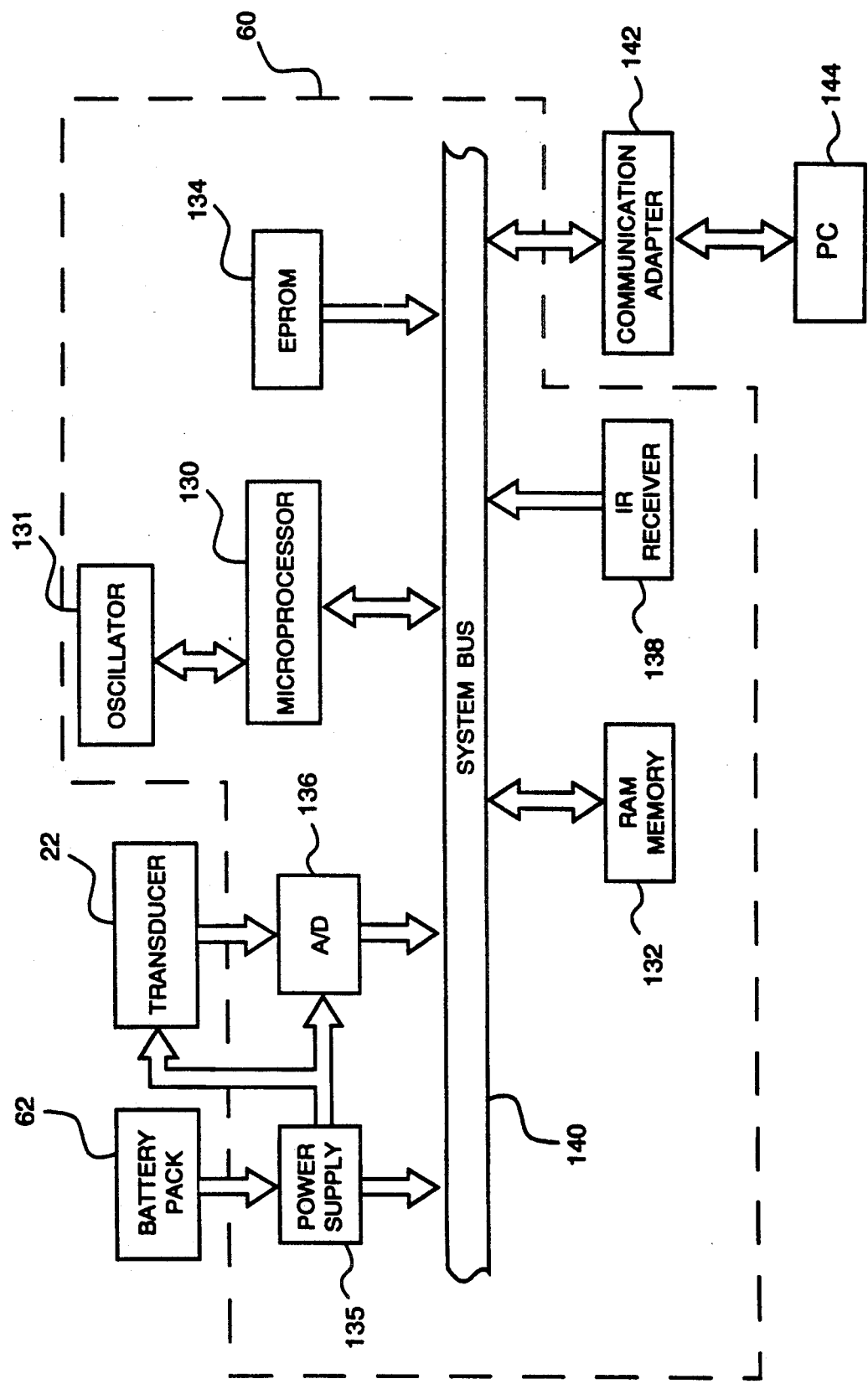
FIG. 7 is a block diagram of a system for monitoring the tension loading of a link-type chain according to the present invention.

Referring now to FIG. 7, the data logger 60 is shown to include a microprocessor 130 such as the HD64180, manufactured by Hitachi, random-access memory (RAM) 132, an electrically programmable read-only memory (EPROM) 134, power supply circuitry 135, analog-to-digital (A/D) circuitry 136 and infrared receiving (IR) circuitry 138 in communication with each other through system bus 140.

The battery pack 62 provides power to the logger 60 through the power supply circuitry 135, which includes a switch for powering down the transducer strain gauges and the A/D amplifiers between readings, thereby extending battery life and reducing power consumption. The power supply circuitry 135 also includes voltage regulators, which, as is known, function to provide proper voltage levels to the electronic componentry of the logger while insuring that the voltage levels do not exceed operational limits.

The data logger also includes an oscillator 131 in communication with the microprocessor 130. In the preferred embodiment, the oscillator 131 is a variable oscillator and provides a clocking signal, whose frequency varies from 768 kHz to 3.072 MHz, to the microprocessor 130. The frequency of the clocking signal is determined by the sampling rate (i.e. desired number of data readings per second), so that the microprocessor can "keep up" with the incoming data. Since the microprocessor operates at a minimum speed required for data collection, power consumption is thereby minimized.

In the preferred embodiment, the EPROM 134 is useful for storing the software program which controls the operation of the data logger 60 as described in greater detail herein below. The RAM 132 is useful for storing the tension loading data collected during execution of the software program.

When the battery pack 62 is disconnected from the logger 60, an additional battery internal to the logger (not specifically shown), such as a capacitor or the like, preferably maintains the power to the RAM memory 132 for a minimum of 5 minutes. The actual time would depend largely on operating temperature and a typical value would be 20 minutes.

Analysis of the acquired tension data will be performed by a computer, such as the personal computer 144. Commercially available software, such as Labtech Notebook with EasySense, available from Validyne Engineering Corp. of Chadworth, Calif., or EasyPlot, available from Cyber Research, Inc., of Massachusetts, or the like, is preferably employed to aid in the processing of the strain gauge data collected.

Since the data logger output is at a transistor-transistor logic (TTL) level, a communication adapter 142 is required. The communication adapter preferably includes an internal power supply for powering the logger 60 when it is connected thereto, as well as the necessary level shifting logic to provide the RS-232C compatible signals to the computer 144. The data logger 60 includes a serial port (not specifically illustrated) which operates at 9600 Baud.

The A/D circuitry 136 is useful for converting the analog electrical strain signals from the Wheatstone bridge 54 of transducer 22 into corresponding digital signals The circuitry 136 is standard A/D circuitry and utilizes the Linear Technology LTC1290 12-bit A/D converter. The circuitry 136 functions as known to one of ordinary skill in the art as described in Linear Technology's 1990 Linear Applications Handbook.

In addition to tensioning of the chain 12, the bridge circuit is sensitive to the supply voltage. Thus, a simple adjustable voltage divider and operational amplifier (op-amp) combination is used to provide a similarly sensitive reference voltage to the A/D circuitry 136. Because these signals will cancel each other out, the absolute voltage level provided by the battery pack 62 is not critical. In the preferred embodiment, the resistors in the voltage divider have a close temperature coefficient for proper tracking since the level provided by the voltage divider will set the scale. Making the divider adjustable provides for calibration of the unit scale. It should be noted that each unit can be calibrated to only one strain gauge assembly.

The use of a 12-bit chip allows resolution of one count in 4096. Thus, the A/D circuitry 136 can resolve down to about 2.5 pounds on a 10,000 lb. full-scale unit, with precision of 10 bits. Although the data logger 60 may be able to sense a 2.5 pound fluctuation in tensioning of the chain 12, the absolute precision would only be accurate to within around 10 pounds. Where higher resolution is required, a 14-bit or 16-bit A/D chip may be utilized, of course. Higher resolution chips, however, cost more and consume more power.

In the preferred embodiment, a plurality of infrared transmitters or marker beacons 146 are positioned adjacent the conveyor 10 along the path of the chain. As previously noted, the data logger 60 includes a window 74 through which the infrared signals from the marker beacons 146 travel. The IR receiver circuitry 138 is, of course, preferably positioned within the data logger 62 in close proximity to the window 74 for receiving the signals. The circuitry 138 is standard IR circuitry and functions as known to one skilled in the art, providing a digital signal to the microprocessor 130.

The signals from the plurality of marker beacons 146 permit the data logger 60 to sense its is operating, as described in greater detail below. In the preferred embodiment, the marker beacons 146 are powered by two (2) "D" size alkaline battery cells, thereby permitting operation for a period of three (3) to six (6) months from a single set of batteries. It should be noted that a beacon marker 146 functions best if located between 12" and 36" inches from the conveyor chain 12.

As the data logger 60 passes a beacon 146, the IR circuitry 138 detects the emitted infrared signal, which is preferably uniquely encoded for identification by the data logger 60. This beacon identification information is stored in the RAM memory 132 along with subsequent strain readings. During analysis of the strain data, the user can thus accurately locate where strain readings were taken and, therefore, where over tensioning of the chain 12 exists. It should be appreciated that in large plants, several unique identification markers may be inserted into the memory 132 to enable more accurate locating of problems.

Figure 8:
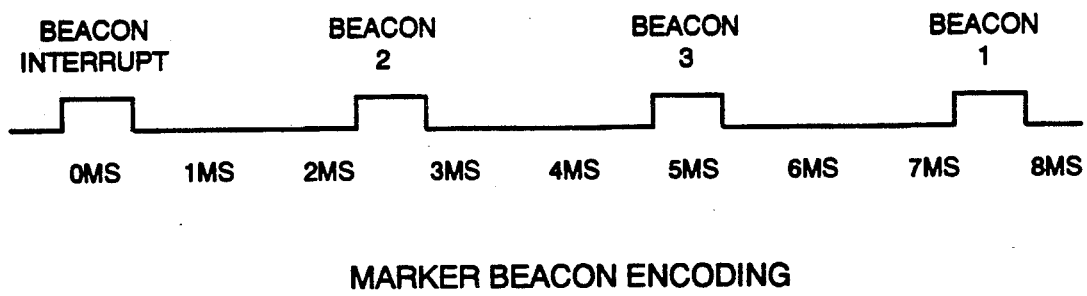
FIG. 8 is a schematic illustration of the infrared marker beacon encoding scheme utilized by the present invention.

As best shown in FIG. 8, the beacon "number" would preferably be encoded by using a variable number of pulses transmitted intermittently from the marker 146 and consisting of from two (2) to four (4) separate pulses. This would allow a total of three (3) marker beacons on a track.

At the beginning pulse the microprocessor 130 would be interrupted and brought out of a "stand-by" mode. The microprocessor would then time the pulses to determine the number of the marker beacon 146 sensed. A special value would be stored in RAM memory 132 to indicate which beacon 146 was detected, thereby providing relative position data to the sample log. It is possible that a single beacon may be detected several times when the module is near.

In the preferred embodiment, the data logger 60 is programmed to partially shut down and enter the "stand-by mode" if no marker beacon 146 is detected within a specified length of time, such as thirty (30) minutes. This feature prevents operation of the data logger 60 when a conveyor 10 is not operating and allows the data logger 60 to achieve the low discharge discussed above. The IR circuitry 138, however, remains powered at all times so that when the conveyor 10 returns to operation and a marker beacon 146 is sensed, the data logger 60 resumes functioning, as described in greater detail above.

It should be appreciated that the presence of three (3) individual marker beacons allows positive determination of the position of the data logger 60. Since only one "#1" beacon is present in a system, its position is known. By having "#2 and "#3" beacons alternately around the track, normal travel would always detect alternating marker beacon numbers. If the chain 12 would reverse direction, the same beacon number would be detected twice.

As was described in greater detail herein above, when a beacon 146 is sensed the data logger 60 will be turned on long enough to take and store the strain gauge data reading. Generally, the analog electronics will take about 20 milliseconds (mS) to stabilize prior to the reading, although the actual conversion requires about only 20 μS. Since the microprocessor 130 must wait for the analog electronics to stabilize, it should be noted that the unprocessed data could be stored in the internal registers of the microprocessor and process the data during the next reading. Storing data in this fashion would provide better use of available power than just waiting in a timing loop.

The data logger 60 must be calibrated for offset and scale during manufacture. When the transducer 22 is manufactured (i.e. when the strain gauges are cemented to the transducer member 46), the strain gauges develop an offset value. This offset, as is known, is due primarily to the tolerance of the individual resistor elements and the strain that develops during the bonding process and can easily be ten times the maximum signal level produced by the strain gauges during operation. Because of this large offset, a standard balance circuit must be provided to eliminate the error signal.

Figure 9:
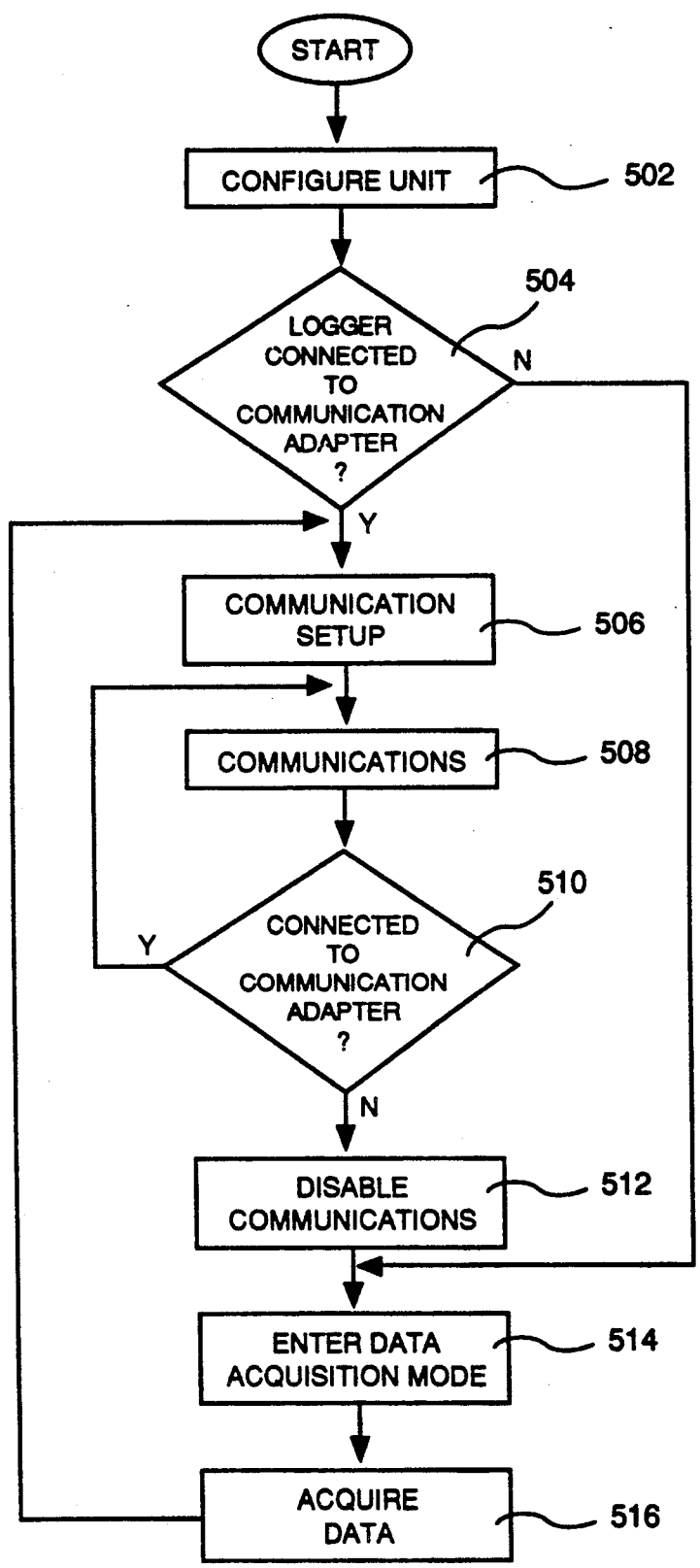
FIG. 9 is a flow chart illustrating operation of the primary program.

Turning now to FIG. 9, there is shown a flow chart illustrating operation of the primary program. Generally, the two basic modes of operation of the data logger 60 are the communications mode and the data acquisition mode, as described in greater detail herein below.

While the logger 60 is connected to the communication adapter 142, communications are enabled and the user selects from a plurality of computer interface messages presented on the display of the computer 144. In this mode, all data acquisition functions are disabled and the unit cannot take data readings or time between beacons. Upon disconnection from the adapter 142, communications are disabled and the data acquisition functions are enabled.

Upon connection of the data logger 60 to the battery pack 62 (i.e. power-up), the logger is configured at step 502 to default values. The default values for the parameters are stored in RAM memory 132, which is battery backed-up, as described above. The parameters configured include the sampling rate, the number of readings to average, the beacon time base, the shutdown time, the reading area, the amount of memory available and the reading scale, each of which is described in greater detail below.

The sample rate parameter is the number of 5 mS time periods between strain gauge readings. The sampling rate can preferably vary from three (3) to six-hundred (600) periods, or 15 mS to 3 seconds (S). It should be appreciated that selecting a sampling rate of remaining powered most of the time, thereby reducing the life of the battery pack 62. As previously described, lithium batteries may be utilized so as to provide an additional 40 to 60 days of operational service.

The number of readings to average parameter represents the number of strain gauge readings that will be added together and averaged prior to storage in the "2" and the largest valid value is "128".

The beacon time base parameter is the amount of time in milliseconds that represents one time tick, for timing between the marker beacons 146. For example, if the beacon time base=0, then the logger will not time, while if the beacon time base=100, then the data logger 60 will increment every 100 mS. The valid non-zero range for this parameter is 50 to 3000, which corresponds to a time base from 50 mS to 3 S.

The shutdown time parameter represents the number of readings to be taken by the logger 60 after a marker beacon 146 has been detected before the logger powers itself down as described above. When the logger 60 reaches the shutdown time parameter, then the logger will read the internal real-time clock, time stamp the data read in the data area and cease to take additional readings until another marker beacon 146 is detected.

The shutdown time parameter is preferably a generally large value, so as to keep the logger 60 from shutting down unnecessarily between beacons. It should be noted that this parameter specifies the number of samples the logger 60 will takes and not the number of strain gauge readings stored in RAM memory 132G. When a different marker beacon 146 is detected, the logger 60 then performs another read of the real-time clock for storage in the data area of RAM memory 132.

The reading area parameter allows the user to program the logger to take strain gauge readings on certain sections of the conveyor. Preferably, the reading area parameter is encoded as follows:
0 —read along entire conveyor;
1—read between beacons 1 and 2;
2—read between beacons 2 and 3; and
3—read between beacons 3 and 1.

The amount of memory parameter represents the amount of memory present in the logger 60. This is the number of memory chips (128 K banks) in the unit. It should be noted that although the logger may be configured for less memory than present and still function properly, the logger 60 could fail if configured for more memory than actually present.

The reading scale parameter selects the reading scale that will be used. If zero ("0") is entered, then the logger 60 will use the lower scale, which preferably corresponds to a transducer capable of sensing up to 10,000 lbs. Use of a lower scale generally offers higher resolution per unit of strain and results in the upper strain limit being lower than if the high scale is used. The high scale, selected by entering one ("1"), is preferably selected if tension loads are expected to exceed the upper limit measurable using the lower scale. The high scale corresponds to a transducer capable of sensing up to 20,000 lbs. Thus, various models of the logger 60 and corresponding transducer 22 may be utilized, depending on the application (e.g. 0-5,000 lbs., 0-10,000 lbs., 0-20,000 lbs., etc.)

If all "Configure Unit" parameters set are valid, then the data readings in RAM memory 132 will be cleared and the real-time clock in the logger 60 unit will be set according to the computer 144.

At step 504, the microprocessor 130 determines if the logger 60 is connected to the communication adapter 142. If the logger is connected to the adapter, the logger enters the communication mode of operation and the logger performs communication set-up at step 506. Communication set-up preferably includes the internal enabling of hardware required for communications to the computer 144.

Figure 10:
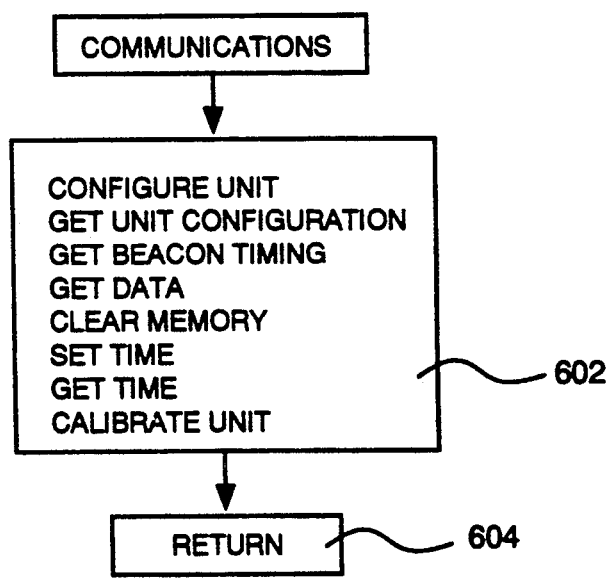
FIG. 10 is a flow chart illustrating the communications options for use with the present invention.

User communication with the logger 60, as shown with additional reference to FIG. 10, is performed upon completion of communications set-up utilizing the communication adapter 142 and computer 144. At step 602, the user is provided with a menu of communication options from which to choose, including Configure Unit, Retrieving Unit Configuration, Retrieving Beacon Timing, Retrieving Data, Clear Memory, Set and-/or Retrieve Time and Calibrate Logger.

The Configure Unit option allows the user to override the default values for the sample rate, number of readings to average, beacon time base, shutdown time, reading area, amount of memory and reading scale parameters established at step 502 as described in greater detail above.

The Retrieve Unit Configuration option allows the user to view the values for the Configure Unit parameters. Selecting this option has no effect on the configuration settings or the data stored in the RAM memory 132.

The Retrieve Beacon Timing option permits the user to view the number of beacon time base counts between marker beacons 146. It should be noted that this parameter represents the number of Beacon Time ticks between beacons in mS.

The Retrieve Data option allows the user to access the strain gauge data readings performed by the logger 60 for storage in a file on the computer 144. To retrieve data, the user preferably first specifies a "reading index", which locates where in the memory 132 the logger 60 should retrieve data. For example, if the user specified "5", then the data retrieval would begin at the fifth reading in the memory 132 and the readings 1 through 4 would be ignored. The user next preferably specifies a "number of readings" which represents how many readings are to be retrieved. If the number of readings specified exceeds the actual number of readings available, all available readings will be retrieved. As described in greater detail above, commercially available software is preferably employed to aid in the processing of the strain gauge data collected.

The Clear Memory option erases the strain data readings stored in the RAM memory. While the number of beacon timing counts is also preferably erased, the unit configuration parameters are not affected by clearing the memory.

The Set Time option permits the user to set the real time clock in the logger. The hour, minute, and second of the time, and the month, day, and year of the date will be set when the message is sent to the logger.

The Retrieve Time option allows the user to retrieve the time and date parameters from the real time clock in the logger. The time is preferably returned as seconds, minutes and hours, in "military" format and the date is returned as day, month and year.

The Calibrate Unit option permits the user to calibrate the logger 60 for operation. The user preferably specifies a reading scale. The reading scale, as described in greater detail above, can be "high" (i.e. 20,000 lbs.) or "low" (i.e. 10,000 lbs.). During calibration, the microprocessor 130 instructs the logger 60 to perform strain gauge data readings from the transducer 22. The data is then downloaded to the computer 144 for processing and comparison with a known load.

After the user has performed any of the above-described communication options, control is returned to the primary program at step 604, wherein the data logger 60 determines at step 510 if the logger is connected to the communication adapter 142, as illustrated in Figure 9. If the logger is still connected to the adapter, the logger remains in communication mode and the user can perform further communication options. If the logger has been disconnected from the adapter, the logger disables the communications at step 512 and enters the data acquisition mode of operation at step 514.

Figure 11:
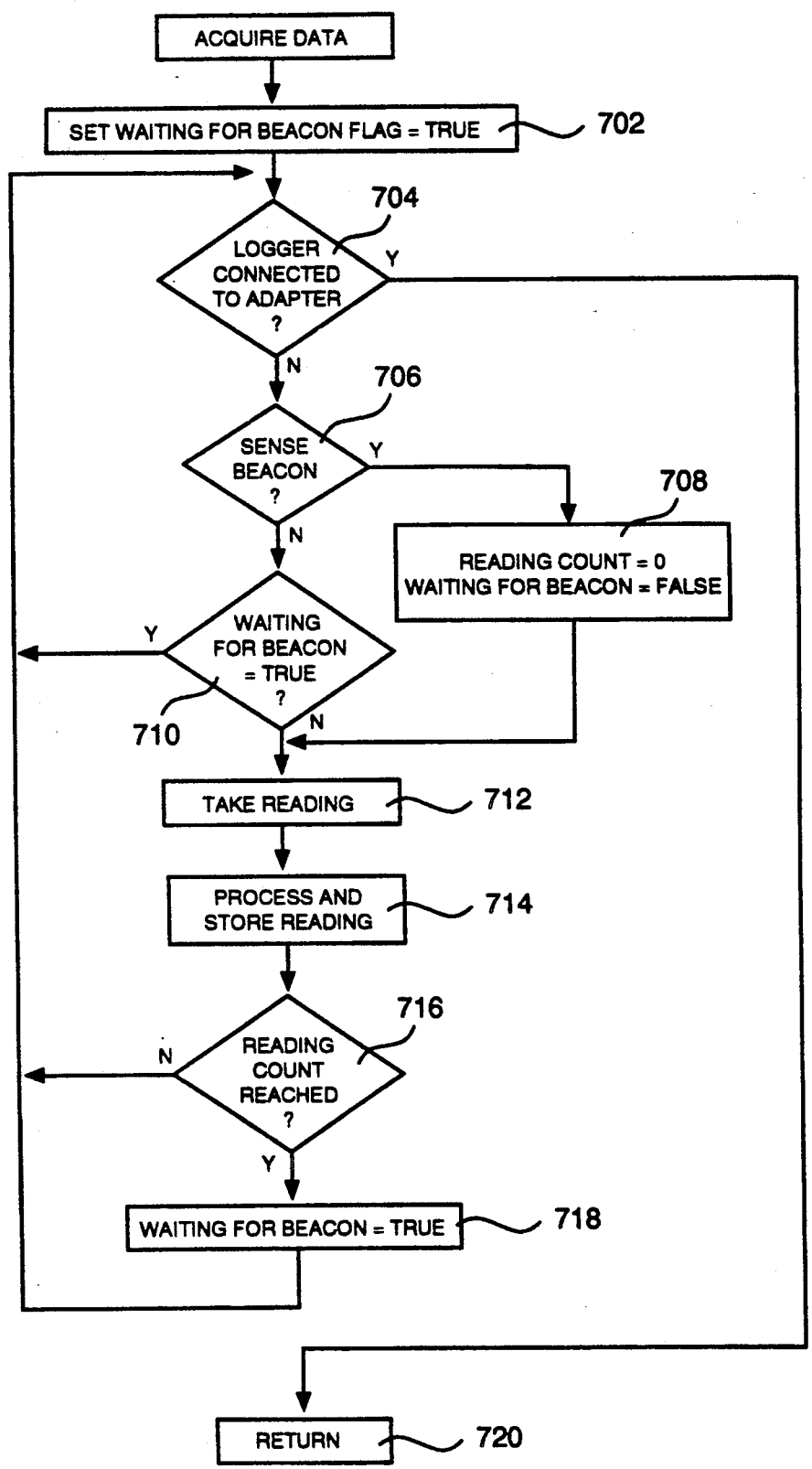
FIG. 11 is a flow chart illustrating the procedure of acquiring data in the data acquisition mode of operation in accordance with the present invention.

As illustrated by combined reference to FIGS. 9 and FIG. 11, the logger 60 acquires data at step 516 by taking strain gauge readings. At step 702, the logger 24 sets the Waiting For Beacon Flag=TRUE, thereby indicating the logger is waiting to sense a marker beacon 146.

At step 704, the logger again determines if it is connected to the communication adapter. If the connection exists, the logger switches to communication mode and control is returned to the primary program at step 720, where steps 506 through 512 would be repeated as described in greater detail above.

If the logger is not connected to the communication adapter, the microprocessor determines, at step 706, if a marker beacon has been sensed. If a beacon has not been sensed, the microprocessor checks the status of the Waiting For Beacon flag at step 710. If the flag=-TRUE, steps 704 through 706 are repeated until a marker beacon is sensed.

If a marker beacon 146 is sensed at step 706, the microprocessor 130 resets the Reading Count parameter=0 and sets the Waiting For Beacon flag=FALSE at step 708. At step 712, the data logger takes a strain gauge reading from the transducer 22.

At step 714, the strain gauge reading is processed by the A/D circuitry 136 and the microprocessor 130 for storage in the RAM memory 132. Preferably, each strain reading will be stored in the memory in a two byte format. Bits 0 through 11 contains the A/D strain reading and bits 12 and 13 are used to identify the beacon number if the reading was taken near a marker beacon 146, according to the following table:

| bit 12 | bit 13 | |
|--------|--------|--|
| 0 | 0 | no beacon detected; |
| 1 | 0 | beacon no. 1; |
| 0 | 1 | beacon no. 2; and |
| 1 | 1 | beacon no. 3. |

Bits 14 and 15 are preferably useful for indicating the whether the strain reading is a normal reading, the first reading after the logger has been shutdown, or a time reading, according to the follow table:

| bit 14 | bit 15 | |
|---|---|---|
| 0 | 0 | normal reading; |
| 0 | 1 | time store; and |
| 1 | 1 | 1st reading after shutdown. |

After a data reading has been successful, the microprocessor 130 determines if more strain gauge readings are to be taken (i.e. if the Reading Count parameter has been achieved) at step 716. Thus, steps 704 through 714 are repeated until the Reading Count has been reached.

If the RAM 132 becomes full, then the data from the next strain gauge reading will be stored over the oldest reading left in memory. In such a case, the oldest reading remaining becomes the "first" reading for purposes of the reading index parameter.

When the Reading Count has been reached, program flow continues at step 718, wherein the microprocessor sets the Waiting For Beacon flag to TRUE. Steps 704 through 716 are then repeated as described above.

It is understood, of course, that while the form of the invention herein shown and described constitutes the preferred embodiment of the invention, it is not intended to illustrate all possible forms thereof. It will also be understood that the words used are words of description rather than limitation and that various changes may be made without departing from the spirit and scope of the invention as disclosed.

What is claimed is:

1. A system for use with a conveyor having a movable conveyor/chain, the system comprising:
   a transducer that is mounted on the chain to travel therewith and to generate an electrical signal based on the tension of the chain; and
   programmable logic means that is mounted on the chain to travel therewith and that is coupled to the transducer, the programmable logic means including a memory that is mounted on the chain to travel therewith, and the programmable logic means including means of converting the electrical signal into tension data for storage in the memory on the chain.

2. The system as claimed in claim 1 wherein the transducer is formed as a tension-transmitting member of the chain.

3. The system as claimed in claim 1 or 2 wherein the chain includes single and dual links pivotally connected in an alternating relationship, each single link having opposite ends and a pair of tension-transmitting members extending therebetween in a relationship to each other, the tension-transmitting members of each single link defining a central cavity in which the programmable logic means is received.

4. The system as claimed in claim 3 wherein the single link further comprises at least one housing portion projecting from the cavity in which the programmable logic means is received.

5. The system as claimed in claim 3 wherein the single link further comprises a pair of housing portions projecting in opposite directions from the cavity in which the programmable logic means is received.

6. The system as claimed in claim 1 or 2 further comprising a position locator including a position generating means for generating a position signal representing a predetermined position along the path of chain movement; said programmable logic means including means for converting the position signal into position data for storage in the memory.

7. The system as claimed in claim 1 or 2 further comprising a plurality of position locators, each of the locators including a position generating means for generating an associated position signal representing an associated position at which the programmable logic means receives the generated electrical signal along the path of chain movement; said programmable logic means including means for converting each position signal into position data for storage in the memory.

8. The system as claimed in claim 7 wherein the programmable logic means further comprises means for correlating the tension data and the position data.

9. The system as claimed in claim 8 further comprising means for communicating the correlated tension and position data to a data storage device.

10. The system as claimed in claim 7 wherein the generating means of each locator includes a transmitter mounted along the length of the conveyor for transmitting an electromagnetic position signal.

11. The system as claimed in claim 10 wherein the generating means of each locator generates an infrared position signal.

12. The system as claimed in claim 7 further comprising communication that is coupled to the programmable logic means, the communication means communicating the tension data nd the position data to a data storage device.

13. The system as claimed in claim 7 wherein the positioning generating means activates the programmable logic means to store the tension data.

14. The system as claimed in claim 7 wherein the programmable logic means continuously receives the generated electrical signal along the path of chain movement.

15. The system as claimed in claim 1 or 2 further comprising an electrical power supply that is mounted on the chain to supply electrical energy to the transducer and the programmable logic means.

16. The system as claimed in claim 15 further comprising cabling for connecting the electrical power supply to the transducer and to the programmable logic means.

17. In a system for use with a conveyor having a movable conveyor chain, the system including a transducer that is mounted on the chain to travel therewith and to generate an electrical signal based on the tension of the chain, the improvement comprising:
   programmable logic means that is mounted on the chain to travel therewith and that is coupled to the transducer, the programmable logic means including a memory that is mounted on the chain to travel therewith, and the programmable logic means including means for converting the electrical signal into tension data for storage in the memory on the chain.

18. The system as claimed in claim 17 wherein the chain includes single and dual links pivotally connected in an alternating relationship, each single link having opposite ends and also having a pair of tension-transmitting members extending between the ends thereof in a spaced relationship to each other, the tension-transmitting members of each single link defining a central cavity in which the programmable logic means is received.

19. The system as claimed in claim 18, wherein the single link further comprises at least one housing portion projecting from the cavity in which the programmable logic means is received.

20. The system as claimed in claim 18, wherein the single link further comprises a pair of housing portions projecting in opposite directions from the cavity in which the programmable logic means is received.

21. The system as claimed in claim 17 further comprising a position locator including a position generating means for generating a position signal representing a predetermined position along the path of chain movement; said programmable logic means including means for converting the position signal into position data for storage in the memory.

22. The system as claimed in claim 17 further comprising a plurality of position locators, each of the locators including a position generating means for generating an associated position signal representing an associated position at which the programmable logic means receives the generated electrical signal along the path of chain movement; said programmable logic means including means for converting each position signal into position data for storage in the memory.

23. The system as claimed in claim 22 wherein the programmable logic means further comprises means for correlating the tension data nd the position data.

24. The system as claimed in claim 23 further comprising means for communicating correlated tension and position data to a data storage device.

25. The system as claimed in claim 22 wherein the generating means of each locator includes a transmitter mounted along the length of the conveyor for transmitting an electromagnetic position signal.

26. The system as claimed in claim 25 wherein the generating means of each locator generates an infrared position signal.

27. The system as claimed in claim 22 further comprising communication mans adapted to be coupled to the programmable logic means, the communication means for communicating the tension data nd the position data to a data storage device.

28. The system as claimed in claim 22 wherein the position generating means activates the programmable logic means to store the tension data.

29. The system as claimed in claim 22 wherein the programmable logic means continuously receives the generated electrical signal along the path of chain movement.

30. The system as claimed in claim 17 further comprising an electrical power supply adapted to be mounted on the chain to supply electrical energy to the transducer and the programmable logic means.

31. The system as claimed in claim 30 further comprising cabling of connecting the electrical power supply to the transducer and to the programmable logic means.

32. A method for monitoring the tension of a movable chain of a conveyor, the method comprising:
mounting a programmable logic means including a memory on the chain to travel therewith;
placing the chain under tension;
generating an electrical signal based on the tension of the chain;
converting the electrical signal by the programmable logic means into tension;
storing the tension data in the memory on the chain.

33. The method as claimed in claim 32 further comprising generating a position signal representing a predetermined position along the path of chain movement and converting the position signal by the programmable logic means into position data.

34. The method as claimed in claim 33 further comprising correlating the position data an the tension data by the programmable logic means to obtain correlated data and storing the correlated data in the memory.

35. The method as claimed in claim 33 wherein the step of generating the position signal utilizes a position locator including a position generating means for generating a position signal representing a predetermined position along the path of chain movement.

36. The method of claim 33 wherein the step of generating the position signal utilizes a position factor including an electromagnetic transmitter for generating a position signal representing a predetermined position along the path of chain movement.

37. The method as claimed in claim 33 wherein the step of generating the position signal activates the programmable logic means to store the tension data.

* * * * *

UNITED STATES PATENT AND TRADEMARK OFFICE
CERTIFICATE OF CORRECTION

PATENT NO. : 5,272,924
DATED : December 28, 1993
INVENTOR(S) : William P. Tassic It is certified that error appears in the above-indentified patent and that said Letters Patent is hereby corrected as shown below:

Column 2, line 44, before "shapes", insert --discloses load measuring devices which have annular--;
Column 2, line 60, after "chain" and before "and" insert --to travel therewith--, and after "and" and before "coupled" insert --that is--;
Column 5, line 17, "an" should be --in--;
Column 6, line 16, "80" should be --82--;
Column 6, line 42, after "in" and before "FIGS." delete "n";
Column 8, line 33, after "its" insert --position relative to the plant in which the conveyor 10--;
Column 10, line 7, after "of" insert --15 mS to 40mS will result in the data logger 60--;
Column 10, line 14, after "the" insert --RAM memory 132. This parameter is preferably a power of--;
Column 13, lines 31-32, claim 1 , "conveyor/chain" should be --conveyor chain--;
Column 14, line 26, claim 12, after "communication" insert --means--;
Column 14, line 28, claim 12, "nd" should be --and--;
Column 15, line 25, claim 25, "nd" should be --and--;
Column 15, line 39, claim 27, "mans" should be --means--;
Column 15, line 41, claim 27, "nd" should be --and--;
Column 16, line 21, claim 32, after "tension" delete ";" and insert --data; and--;

UNITED STATES PATENT AND TRADEMARK OFFICE
CERTIFICATE OF CORRECTION

PATENT NO. : 5,272,924
DATED : December 28, 1993
INVENTOR(S) : William P. Tassic It is certified that error appears in the above-indentified patent and that said Letters Patent is hereby corrected as shown below:

Column 16, line 38, claim 36, delete "factor" and insert --locator--.

Signed and Sealed this

Nineteenth Day of July, 1994

Attest:

BRUCE LEHMAN

*Attesting Officer*    *Commissioner of Patents and Trademarks*